No. 873,764.
PATENTED DEC. 17, 1907.
A. W. MANZ.
MOTOR STARTER.
APPLICATION FILED DEC. 24, 1906. RENEWED NOV. 4, 1907.
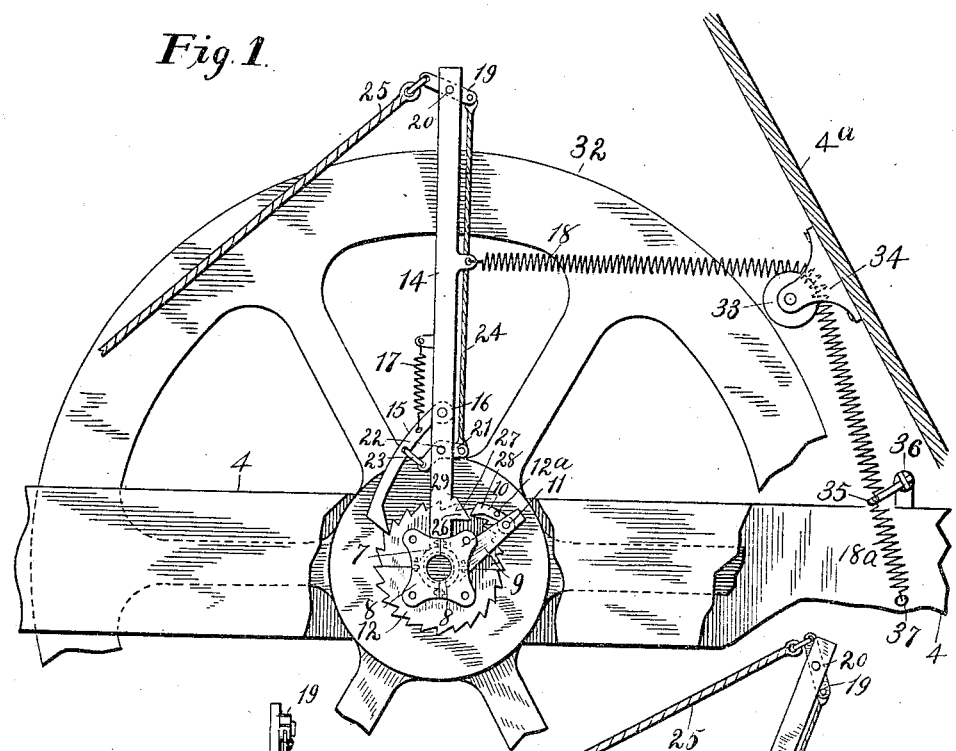
Fig. 1.
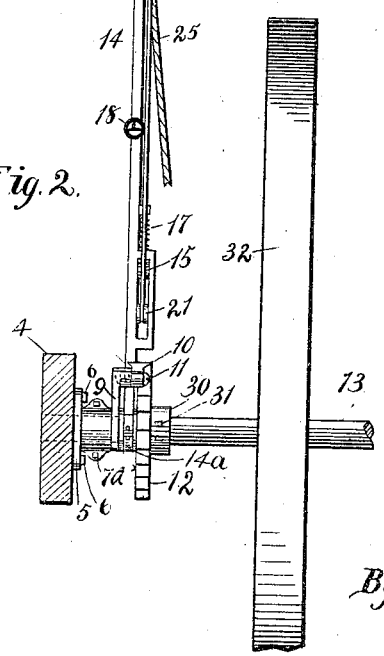
Fig. 2.
Fig. 3.
Witnesses:
C. F. Barrett
M. A. Milock
Inventor
Adolph W. Manz
By Frederick Benjamin
Atty.

UNITED STATES PATENT OFFICE.

ADOLPH W. MANZ, OF CHICAGO, ILLINOIS, ASSIGNOR TO PAUL H. MANZ, OF CHICAGO, ILLINOIS.

MOTOR-STARTER.

No. 873,764.   Specification of Letters Patent.   Patented Dec. 17, 1907.

Application filed December 24, 1906. Serial No. 349,356. Renewed November 4, 1907. Serial No. 400,548.

*To all whom it may concern:*

Be it known that I, ADOLPH W. MANZ, citizen of the United States, residing at Chicago, in the county of Cook and State of Illinois, have invented certain new and useful Improvements in Motor-Starters, of which the following is a specification.

My invention relates to starting devices for explosive engines and its chief objects are to provide means for preventing a reverse movement of the engine shaft when a forward impulse has been given thereto by the operation of the starting mechanism; to provide means for automatically controlling the compression release cock when the starting device is manually operated, and to furnish means for holding the operative pawls out of engagement with the coöperating parts when the actuating lever is in its initial position.

I accomplish the above and other minor objects by means of the mechanism illustrated in the accompanying drawing which forms a part of this specification and in which—

Figure 1 is a side elevation of a motor starting device attached to the chassis or framework of a motor vehicle; Fig. 2 is a rear elevation; Fig. 3 is a side view of the reciprocating lever and attachments showing their relation to the ratchet wheel when said lever is in its initial position.

Referring to drawing, the numeral 4 indicates the frame of a motor car to which a plate 5 is secured by bolts or screws 6. Projecting from the center of said plate and formed integral therewith is a sleeve 7 having a bore 8 which registers with the engine shaft. The said plate and sleeve are formed in two parts, secured by bolts 7ª to facilitate assembling when the shaft passes through the frame. From near the free end of said sleeve 7 a fixed arm 9 projects at an angle and carries a dog 10 pivoted thereto at 11, and adapted to engage the teeth of a ratchet-wheel 12 secured to the engine shaft 13. To prevent the dog from being displaced it is provided with a pin 12ª which will engage the arm 9 when the dog is raised beyond the required position.

An oscillating lever 14 engages a peripheral groove in the sleeve 7 by means of a split bearing 14ª. An actuating pawl 15 is attached to the said lever by a pin 16 and is held in a retracted position by a spring 17. The lever 14 is held in its initial position, as shown in Fig. 3, by means of a tension spring 18. A cross bar 19 is secured to the lever 14 near its upper end and is adapted to swing or rock on a center 20. Below the attachment of the pawl 15 a bell crank lever 21 is secured to the lever 14 by a pivot pin 22. One end of said bell-crank lever is attached to the pawl 15 by a short link 23, and to the other end is attached a flexible metal cord 24 which forms a connection with one end of the said cross bar 19. To the opposite end of said bar 19 is secured a traction rope or cable 25 which may be carried to any desired location so as to be within convenient reach of the operator.

A projection 26 extends rearwardly from the lever 14 its rear face 27 being inclined and adapted to engage the said dog 10 when the lever 14 is retracted by the spring 18 to its initial position thus raising the dog out of engagement with the said ratchet wheel 12. When thus raised the point of the dog will be received into a notch 29 and thus kept clear of the ratchet teeth. The said ratchet wheel 12 and its collar 30 are formed in two parts united by bolts 31 thus permitting the ready attachment of said wheel to the shaft 13 without requiring the latter to be dismantled for that purpose which would be necessary in certain constructions. The usual fly wheel 32 is carried by the shaft but has no connection with my device.

A pulley 33 adapted to receive the tension spring 18 for the purpose of changing its direction is supported on a bracket 34 secured to the body 4ª. The spring 18 after passing over this pulley is continued in a downward direction and is fastened to the lever 35 of the compression release cock 36. Attached to the said lever is a short spring 18ª which is secured at its other end 37 to any convenient place below. This connection between the tension spring and release cock is so adjusted as to cause the latter to be opened when the spring is extended by the operation of the lever 14, and closed when the said spring is allowed to contract, thus positively controlling the cock at the desired time relatively to the movement of the starting mechanism and permitting easy action by allowing some of the compression to escape from the cylinder.

The operation of the device is as follows: With the mechanism in the initial position shown in Fig. 3, traction is made manually upon the cable 25, transmitting motion through the cross bar 19 and bell-crank lever 21 and connecting cord 24 to the driving pawl 15 which will be thus extended until it is in engagement with the ratchet wheel 12. Further traction upon said cable will carry the main lever 14 to the position shown in Fig. 1, thus permitting the dog 10 to engage the teeth of the ratchet wheel. Continuing the pull upon the cable will carry the main lever over its arc of movement and the pawl 15 will turn the ratchet wheel and engine shaft upon which it is mounted at the same time the lever 35 will be moved sufficiently to open the cock 36 to the extent required to relieve the compression. The cable 25 is then released and the tension of the spring 18 will carry the parts back to their initial position the inclined face 27 of the projection 26 lifting the dog out of engagement with the ratchet and holding it with the point resting in the notch 29 until the lever 14 is again actuated.

Having thus described my invention what I claim as new, is:—

1. A motor starter, including a lever, a ratchet wheel removably mounted upon the motor shaft, a pawl attached to said lever, a plurality of rock-bars mounted on said lever and having flexible connection with each other and with said pawl, means for operating the lever, a dog adapted to engage the said ratchet-wheel during the reverse movement of the lever and means for holding the said dog out of engagement with the ratchet-wheel when the said lever is in its initial position.

2. A motor starter including a lever, a ratchet wheel mounted upon the motor shaft, an actuating pawl attached to said lever, a plurality of rock bars carried by the lever and having flexible connection with each other and with said pawl, a dog adapted to engage the teeth of the ratchet wheel during the backward movement of said lever, means for holding said dog out of engagement with the ratchet teeth when said lever is in its initial position, a tension spring attached to the lever and means for changing the direction of said spring.

3. A motor starter including a lever, a ratchet wheel mounted upon the motor shaft, an actuating pawl pivotally attached to said lever, means for operating the lever, a dog adapted to engage the teeth of said ratchet wheel during the backward movement of said lever, a tension spring secured to the lever, means for changing the direction of said tension spring and a connection between said spring and the lever of the motor compression release cock.

4. A motor starter, including an operating lever, detachably secured to a removable sleeve, an actuating pawl carried on said lever, means flexibly connected with said pawl for operating the lever, a dog adapted to engage the teeth of said ratchet-wheel during the backward movement of said lever, means for holding said dog out of engagement with the said ratchet teeth when the lever is in its initial position, a coiled spring attached to the lever and a pulley for changing the direction of said spring.

5. A motor starter including a lever, a ratchet wheel mounted upon the motor shaft, a pawl for actuating said ratchet wheel pivoted to the lever, rocking members carried by said lever, means for operating the lever attached to one of said rocking members, connection between the other of said members and said pawl, connection between said members, a dog carried by a fixed support, and adapted to engage the ratchet wheel, means for holding said dog out of engagement with the ratchet wheel when the lever is in its initial position, a spring attached to the lever and having operative connection with the lever of the motor compression release cock, and a second spring connecting the said lever to a fixed point.

6. A motor starter including a lever, a ratchet wheel removably mounted upon the main shaft of the motor, a pawl adapted to operate said ratchet wheel and carried by the lever, rock-bars carried by the lever and having flexible connection with each other and with said pawl, an operating cable attached to one of said rock-bars, a dog mounted upon a fixed support and adapted to engage the teeth of said ratchet wheel when the lever is moved backward, means for lifting said dog out of its operative position, means for holding the dog out of engagement with the ratchet teeth while the lever is in its initial position, a spring attached to the said lever and having operative connection with the lever of the motor compression release cock, and a second spring connecting the said lever to a fixed point.

In testimony whereof I affix my signature in presence of two witnesses.

ADOLPH W. MANZ.

Witnesses:
R. S. CHILTON, Jr.,
ADELAIDE C. WADE.